(12) United States Patent
Yasui et al.

(10) Patent No.: US 6,921,083 B2
(45) Date of Patent: Jul. 26, 2005

(54) SEALING APPARATUS AND A ROLLING BEARING AND A CLUTCH APPARATUS PROVIDED THEREWITH

(75) Inventors: Makoto Yasui, Iwata (JP); Koji Sato, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 10/262,495

(22) Filed: Oct. 1, 2002

(65) Prior Publication Data

US 2003/0062690 A1 Apr. 3, 2003

(30) Foreign Application Priority Data

Oct. 1, 2001 (JP) ........................................ 2001-304916

(51) Int. Cl.$^7$ .............................................. F16J 15/32
(52) U.S. Cl. ...................................... 277/572; 277/551
(58) Field of Search ................................ 277/572, 573, 277/551, 571, 562

(56) References Cited

U.S. PATENT DOCUMENTS

| | | | | |
|---|---|---|---|---|
| 2,000,276 A | * | 5/1935 | Delaval-cro ................. | 384/488 |
| 2,867,457 A | * | 1/1959 | Reising et al. ............... | 277/562 |
| 2,879,114 A | * | 3/1959 | Bowen ......................... | 384/486 |
| 2,915,345 A | * | 12/1959 | Workman .................... | 277/575 |
| 3,014,768 A | * | 12/1961 | Dickinson ................... | 384/484 |
| 3,114,559 A | * | 12/1963 | Migleietti et al. ........... | 277/376 |
| 3,494,682 A | * | 2/1970 | Keller ......................... | 277/551 |
| 3,790,238 A | * | 2/1974 | Otto ............................ | 384/486 |
| 4,183,592 A | * | 1/1980 | Sudo et al. .................. | 384/488 |
| 4,325,591 A | * | 4/1982 | Otto ............................ | 384/486 |
| 5,472,284 A | * | 12/1995 | Alling et al. ................ | 384/484 |
| 5,975,534 A | * | 11/1999 | Tajima et al. ............... | 277/353 |
| 6,315,296 B1 | * | 11/2001 | Oldenburg .................. | 277/353 |
| 6,450,503 B1 | * | 9/2002 | Dossena et al. ............ | 277/572 |
| 6,464,228 B1 | * | 10/2002 | Oldenburg .................. | 277/309 |

* cited by examiner

*Primary Examiner*—Alison K. Picard
(74) *Attorney, Agent, or Firm*—Harness, Dickey & Pierce, P.L.C.

(57) ABSTRACT

A sealing apparatus (20) has a slinger (22) with a substantially L-shaped cross-section including a cylindrical portion (22a) to be fitted on a member of rotational side and an upstanding portion (22b) radially extending from one end of the cylindrical portion (22a). The apparatus also has a core member (23a) of a substantially L-shaped cross-section including a cylindrical portion (23aa) to be fitted in a member of stationary side and an upstanding portion (23ab) radially extending from one end of the cylindrical portion. Further included is a sealing element (23b) including one ore more side lips (23ba) and (23ba) adapted to be slidably contacted with the upstanding portion (22b) of the slinger (22) and one or more radial lips (23bb) adapted to be slidably contacted with the cylindrical portion (22a) of the slinger (22). An interference of a portion of the cylindrical portion (23aa) and/or (22a) of the core member (23a) and/or the slinger (22) near the upstanding portion (23ab) and/or (22b) is formed smaller than that of the other portion of the cylindrical portion (23aa) and/or (22a) of the core member (23a) and/or the slinger (22).

4 Claims, 3 Drawing Sheets

(a)  (b)  (c)

SEALING APPARATUS AND A ROLLING BEARING AND A CLUTCH APPARATUS PROVIDED THEREWITH

CROSS-REFERENCE TO RELATED APPLICATIONS

This application claims priority to Japanese Patent Application Nos. 2001-304916 filed Oct. 1, 2001, which application is herein expressly incorporated by reference.

FIELD OF THE INVENTION

The present invention relates to a sealing apparatus and more particularly to a sealing apparatus used, for example, for a rolling bearing and a clutch apparatus.

BACKGROUND OF THE INVENTION

There is a clutch apparatus of the prior art having the sealing apparatus of this kind, for example, as shown in FIG. 4.

A clutch apparatus 50 includes inner member 51 which engages an input shaft 52 via a serration 53 and has a plurality of cam surfaces 54 on the outer circumferential surface. A hollow outer member 55 is arranged coaxially with the inner member 51 and has a cylindrical surface 56 formed on an inner circumferential surface. An annular wedge-shaped space is formed by a cam surface 54 of the inner member 51 and a cylindrical surface 56 of the outer member 55. A retainer 57 is arranged within the wedge-shaped cylinder in which a plurality of rollers 58, as engaging elements, are held by pockets formed therein. The retainer 57 and thus the rollers 58 are normally urged by a switch spring 59 toward a neutral position. In the neutral position, the rollers 58 do not engage with the cylindrical surface 56 and the cam surface 54. By changing the phase of the retainer, the rollers are moved toward either an engaging position or a disengaging position of the inner member 51 and the outer member 55. Thus the function of the clutch can be achieved.

A rotor 60 having a substantially annular recessed cross-section is secured to the outer member 55 and an armature 61 is arranged opposed to the rotor 60 via a suitable gap therebetween. The rotor 60 and the armature 61 are intimately pressed against each other by energizing an electromagnetic coil 62.

In this clutch apparatus 50, the retainer 57 and the rollers 58 are urged toward the neutral position of the cam surface 54 formed on the inner member 51 by the switch spring 59 when the electromagnetic coil 62 is deenergized. Thus, the inner member 51 and the outer member 55 are kept in the freely rotatable condition with each other. On the contrary, if it is desired that the inner member 51 and the outer member 55 are to be drivingly engaged with each other, the electromagnetic coil 62 is energized in order to intimately attract the armature 61 to the rotor 60 secured to the outer member 55. The frictional torque thus caused by the pressure contact of the armature 61 against the rotor 60 is transmitted to the retainer 57 and the outer member 55 via armature 61 and the rotor 60. This causes a relative rotation between the inner member 51 and the outer member 55. The frictional torque overcomes the force of the switch spring 59 and thus the retainer 57 and the rollers 58 are rotated in the same direction as that of the outer member 55. Accordingly the rollers 58 are moved from the neutral position to the wedge engagement position and thus the inner member 51 and the outer member 55 are drivingly engaged.

The outer member 55 is supported by a housing 64 via a roller bearing 63. Immigration of muddy slurry or foreign matter into the clutch apparatus 50 is prevented by sealing apparatus 65 and 66 arranged at opposite ends of the housing 64.

The sealing apparatus 65, arranged at an externally opened side of the housing 64, is formed by a combination of a slinger and a seal lip which has a superior sealing performance. As shown in FIG. 5, the seal apparatus 65 includes a sealing member 67, and a slinger 68 to be fitted in the outer member 55 as a member of rotational side. The sealing member 67 includes a core member 67a of a substantially L-shaped cross-section and a sealing element 67b adhered to the core member 67a by vulcanization and adapted to be slidably contacted with the slinger 68.

The core member 67a has a cylindrical portion 67aa to be fitted in the housing 64 and an upstanding portion 67ab radially extending from one end of the cylindrical portion 67aa. Similarly, the slinger 68 is also of a substantially L-shaped cross-section and has a cylindrical portion 68a to be fitted on the outer member 55 and an upstanding portion 68b radially extending from one end of the cylindrical portion 68a. The sealing element 67b has one or more side lips 67ba adapted to be slidably contacted with the upstanding portion 68a of the slinger 68 and one or more radial lips 67bb adapted to be slidably contacted with the cylindrical portion 68a of the slinger 68.

In the sealing apparatus 65 of the prior art, since the cylindrical portions 67aa and 68a of the sealing member 67 and the slinger 68 have a high rigidity, the deformation of the cylindrical portions 67aa and 68a caused during the press fitting of them tend to cause deformations of the upstanding portions 67ab and 68b. Thus it is necessary to strictly control the press fit interference. The higher the cross-section of the sealing apparatus 65, the larger the deformation of the upstanding portion 67ab and 68b. Change of the lip interference and/or the warp caused in the upstanding portions often cause the reduction of the sealing performance.

Although it is possible to reduce the amount of press fitting in order to suppress the deformations during the press fitting operation, the reduction of the amount of press fitting would cause the sealing performance of the cylindrical portions 67aa and 68a.

SUMMARY OF THE INVENTION

It is, therefore, an object of the present invention to provide a sealing apparatus which can reduce the deformation due to the press fit of the sealing apparatus and thus can obtain a desirable improved sealing performance.

According to the present invention, a sealing apparatus includes a core member of a substantially L-shaped cross-section including a cylindrical portion to be fitted in one member and an upstanding portion radially extending from one end of the cylindrical portion. A lip member is secured on the core member and is adapted to be slidably contacted with another member characterized in that an interference of a portion of the cylindrical portion near the upstanding portion is formed smaller than that of the other portion of the cylindrical portion.

According to the invention, it is possible to suppress the deformation of the core member during the press fit. Thus, it is possible to maintain the desirable sealing performance without causing change of the lip interference.

According to the present invention, a sealing apparatus includes a slinger with a substantially L-shaped cross-section including a cylindrical portion to be fitted on a member of rotational side and an upstanding portion radially extending from one end of the cylindrical portion. A core member has a substantially L-shaped cross-section including a cylindrical portion to be fitted in a member of stationary side and an upstanding portion radially extending from one end of the cylindrical portion. A sealing element including one or more side lips is adapted to be slidably contacted with the upstanding portion of the slinger and one or more radial lips are adapted to be slidably contacted with the cylindrical portion of the slinger. An interference of a portion of the cylindrical portion of the core member and/or the slinger near the upstanding portion is formed smaller than that of the other portion of the cylindrical portion of the core member and/or the slinger. Also, the thickness of the portion of the cylindrical portion near the upstanding portion is formed smaller than that of the other portion of the cylindrical portion. It is also preferable that the cylindrical portion is formed so that its diameter is gradually increased or decreased from the upstanding portion side toward the free end side.

Additionally, a rolling bearing includes outer ring formed with a raceway on the inner circumferential surface. An inner ring is formed with a raceway on the outer circumferential surface arranged opposite to the raceway of the outer ring. A plurality of rolling elements are arranged between the raceways of the outer and inner rings. The above sealing apparatus are arranged in end annular spaces between the outer and inner rings. Accordingly, the rolling bearing ensures prevention of the leakage of grease sealed within the bearing and the immigration of dust into the bearing from the outside even though it is laid under severe circumstances.

According to the present invention, a clutch apparatus includes an inner member, a hollow outer member arranged coaxially with the inner member, a plurality of engaging elements arranged between the inner and the outer members, and wedge shaped spaces of different radial distances formed between the engaging elements and the inner or outer member according to a relative position between the inner and outer members. The engagement and disengagement of the inner and outer members is carried out by the engagement and disengagement between the wedge-shaped space and the engaging elements. The sealing apparatus described above is arranged in an open end annular space between the inner and outer members.

Accordingly, the rolling bearing ensures prevention of the leakage of grease sealed within the clutch apparatus and the immigration of dust into the clutch apparatus from the outside and also it is possible to suppress the influence to the sealing apparatus even though the deformation of the inner or outer member due to the engagement of the engaging elements.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2(*b*) is an enlarged view of an encircled part of FIG. 2(*a*) showing one modified embodiment of the sealing apparatus of the present invention;

FIG. 2(*c*) is an enlarged view of an encircled part of FIG. 2(*a*) showing another modified embodiment of the sealing apparatus of the present invention;

DETAILED DESCRIPTION OF THE PREFERRED EMBODIMENTS

Figure 1:
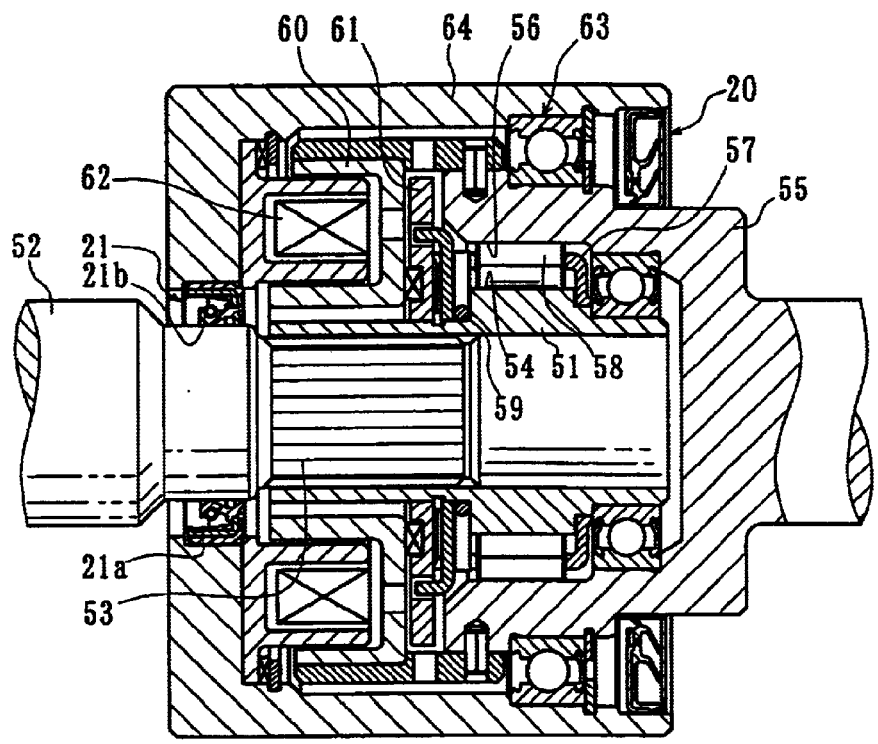
FIG. 1 is a longitudinal cross-section view of a clutch apparatus with the sealing apparatus of the present invention.

The present invention will be described with reference to FIGS. 1 through 3 of the accompanying drawings. FIG. 1 is a longitudinal cross-section view showing a clutch apparatus with the sealing apparatus 20 and 21 of the present invention. Since the clutch apparatus itself shown in FIG. 1 is same as that shown in FIG. 4, the same reference numerals are used for designating the same parts.

Figure 2:
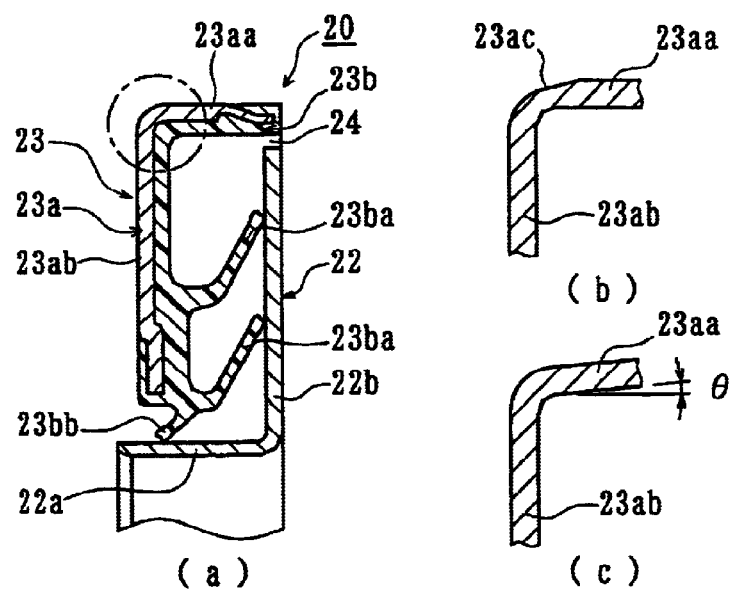
FIG. 2(*a*) is a partially enlarged longitudinal cross-section view of the sealing apparatus of the present invention.

The sealing apparatus 20 of the present invention, as shown in FIG. 2(*a*), has a slinger 22 to be arranged on an inner circumferential side (the outer member 55) in the illustrated embodiment. A seal member 23 is to be arranged on an outer circumferential side of the housing 64 in the illustrated member. The slinger 22 is formed as a substantially L-shaped cross-section member including a cylindrical portion 22*a* to be fitted in the outer member 55 and an upstanding portion 22*b* radially extending from one end of the cylindrical portion 22*a*. The sealing member 23 is adapted to be arranged oppositely to the slinger 22. The sealing member 23 includes a core member 23*a* of a substantially L-shaped cross-section which includes a cylindrical portion 23*aa* to be fitted in the housing 64 and an upstanding portion 23*ab* radially extending from one end of the cylindrical portion 23*aa*. A sealing element 23*b*, including one or more side lips 23*ba*, is adapted to be slidably contacted with the upstanding portion 22*b* of the slinger 22. The sealing element 23*b* also includes one or more radial lips 23*bb* adapted to be slidably contacted with the cylindrical portion 22*a* of the slinger 22. In addition, a labyrinth seal 24 is formed by arranging the peripheral edge of the upstanding portion 22*b* of the slinger 22 opposite to the inner circumferential surface of the sealing element 23 via a slight gap therebetween.

As shown in FIGS. 2(*b*) and (*c*) in an exaggerated manner, the core member 23*a* is formed so that an interference of a portion of the cylindrical portion 23*aa* of the core member 23*a* near the upstanding portion 23*ab* is smaller than that of the other portion of the cylindrical portion 23*aa* of the core member 23*a*. In order to achieve this, the outer peripheral corner 23*ac* between the cylindrical portion 23*aa* and the upstanding portion 23*ab* is formed by a circular arc which has a large radius of curvature or by a combination of a tapered portion and a circular arc in the example shown in FIG. 2(*b*). Thus, the corner 23*ac* has a thickness thinner than cylindrical portion 23*aa*.

In another example shown in FIG. 2(*c*), the interference is achieved by inclining the cylindrical portion 23*ad* at an angle so that the radius of the cylindrical portion 23*ad* gradually increases from the end of the cylindrical portion 23ab adjacent to upstanding portion 23ab toward the free end thereof. Such a structure can suppress the deformation of the core member 23a and thus the change of interference of the lip seals 23ba and 23bb during the press fit operation. These characteristic features of the present invention are applied not only to the core member 23a, but to the slinger 22.

When the sealing apparatus 20 is mounted on the clutch apparatus, it is possible to ensure prevention of the leakage of grease sealed within the clutch apparatus and the immigration of dust into the clutch apparatus from the outside even though it is laid under severe circumstances. Also, it is possible to suppress the influence to the sealing apparatus 20 even though the inner or outer member 1 or 2 is deformed due to the engagement of the rollers 58 therewith.

A sealing apparatus 21 includes a core member 21a to be fitted in an inner peripheral surface of a bore of the housing 64. A sealing element 21b has radial lips adapted to be slidably contacted with the outer peripheral surface of the input shaft 52. The characteristic features of the present invention mentioned above are applied to the corner of the core member 21a having a substantially L-shaped configuration.

Figure 3:
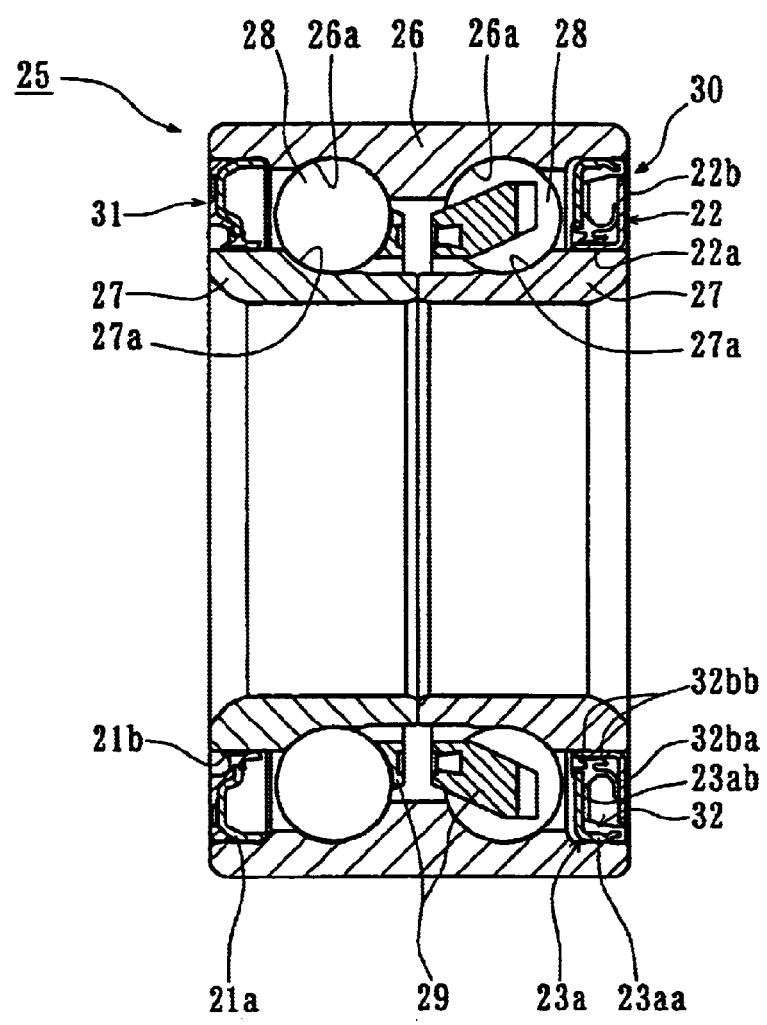
FIG. 3 is a longitudinal cross-section view of a roller bearing with the sealing apparatus of the present invention.
Figure 4:
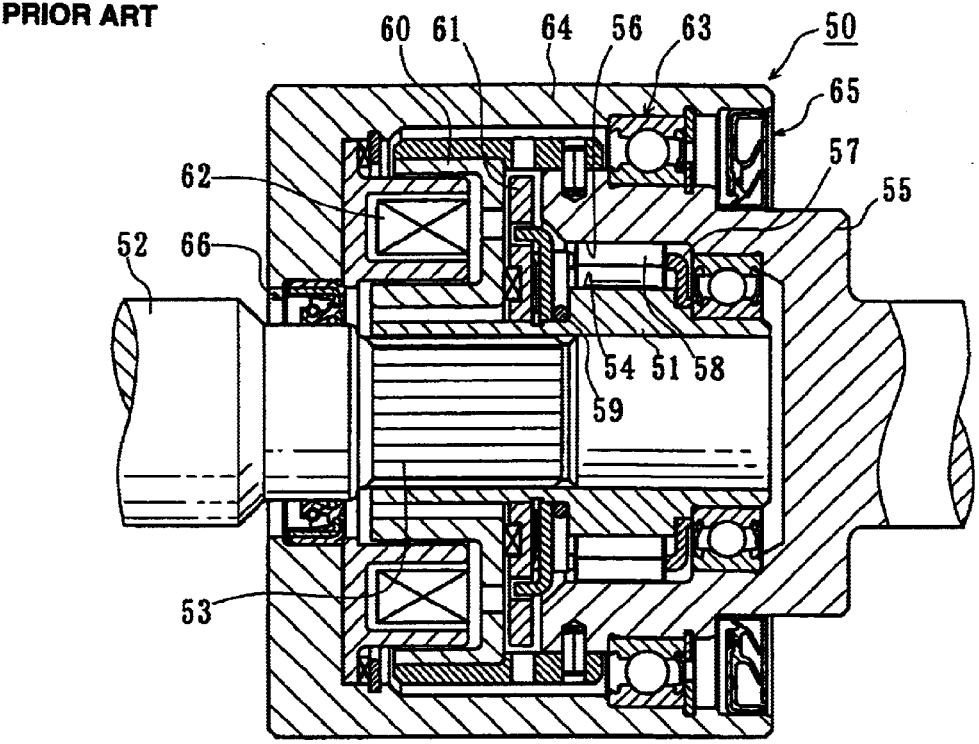
FIG. 4 is a longitudinal cross-section view of a clutch apparatus with the sealing apparatus of the prior art.
Figure 5:
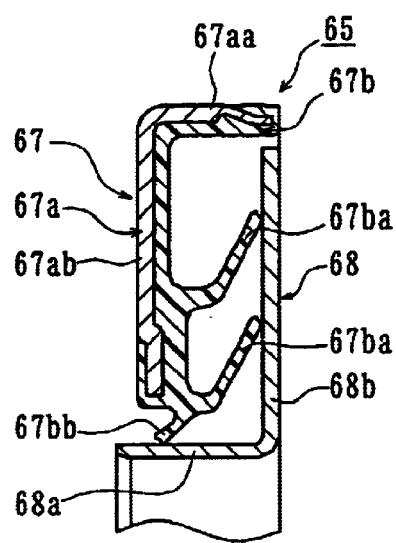
FIG. 5 is a longitudinal cross-section view of the sealing apparatus of the prior art.

FIG. 3 is a longitudinal cross-section view of a roller bearing of the other embodiment of the present invention into which the sealing apparatus of the present invention are incorporated.

The roller bearing 25 is a double row angular contact ball bearing and comprises an outer ring 26 formed with double row raceways 26a on the inner circumferential surface. A pair of inner rings 27 formed on the outer circumferential surfaces with the double row raceways 27a that oppose the double row raceways 26a. Double row rolling elements (balls) 28 are arranged between the double row raceways 26a and 27a. Cages 29 rotatably hold rolling elements 28 equidistantly along a circumferential direction. Sealing apparatus 30 and 31 are provided that have similar structures as those described above.

The sealing apparatus 30 is different from the sealing apparatus 20 only in the number of the radial lips. Thus, the same reference numerals are used to designate other identical parts shown in FIG. 2.

The sealing apparatus 30 includes the slinger 22 and the sealing member 32 with the core member 23a and the sealing element 32b. The sealing element 32b includes the side lip 32ba adapted to be slidably contacted with the upstanding portion 22b of the slinger 22, and the radial lips 32bb.

The sealing apparatus 31 is different from the sealing apparatus 21 only in the configurations of the core member and the sealing element. Thus, the same reference numerals are used for designating other identical parts shown in FIG. 2.

When the sealing apparatus 30 and 31 are mounted on the rolling bearing 25, it is possible to ensure the prevention of leakage of grease sealed within the roller bearing and the immigration of dust into the bearing from the outside even though it is laid under severe circumstances. In addition, it is also possible to suppress the influence to the sealing apparatus 30 and 31 even though the inner ring 26 or outer ring 27 is deformed during the press fitting operation.

The sealing apparatus of the present invention has the following characteristic features. First, since the interference of a portion of the cylindrical portion near the upstanding portion is formed smaller than that of the other portion of the cylindrical portion, it is possible to suppress the deformation of the core member during the press fit. This maintains the desirable sealing performance without causing change of the lip interference.

Second, the rolling bearing, in which the sealing apparatus of the present invention is incorporated, ensures prevention of leakage of grease sealed within the roller bearing and the immigration of dust into the bearing from the outside even though it is laid under severe circumstances. In addition, it is also possible to suppress the influence to the sealing apparatus 30 and 31 even though the inner ring 26 or outer ring 27 is deformed during the press fitting operation thereof.

Third, when the sealing apparatus are mounted on the clutch apparatus, they ensure prevention of the leakage of grease sealed within the clutch apparatus and the immigration of dust into the clutch apparatus from the outside even though it is laid under severe circumstances. Also, it is possible to suppress the influence to the sealing apparatus even though the inner or outer member is deformed due to the engagement of the rollers therewith.

The present invention has been described with reference to the preferred embodiment. Obviously, modifications and alternations will occur to those of ordinary skill in the art upon reading and understanding the preceding detailed description. It is intended that the present invention be construed as including all such alternations and modifications insofar as they come within the scope of the appended claims or the equivalents thereof.

What is claimed is:

1. A sealing apparatus comprising:
   a core member of a substantially L-shaped cross-section including a cylindrical portion to be fitted in one member and an upstanding portion radially extending from one end of the cylindrical portion; and
   an elastomeric lip member secured on the upstanding portion of the core member adapted to be slidably contacted with another member, wherein the thickness of the core member at the junction between the upstanding portion and the cylindrical portion is thinner than the thickness of the cylindrical portion immediately adjacent the junction, such that the interference of the cylindrical portion is smaller at the junction than the adjacent cylindrical portion when fitted in the member.

2. A rolling bearing comprising:
   an outer ring formed with a raceway on the inner circumferential surface thereof;
   an inner ring formed with a raceway on the outer circumferential surface thereof arranged opposite to the raceway of the outer ring; and
   a plurality of rolling elements arranged between the raceways of the outer and inner rings wherein sealing apparatus of claim 1 are arranged in end annular spaces between the outer and inner rings.

3. A clutch apparatus comprising:
   an inner member;
   a hollow outer member arranged coaxially with the inner member;
   a plurality of engaging elements arranged between the inner and the outer members; and
   wedge shaped spaces of different radial distances formed between the engaging elements and the inner or outer member according to a relative position between the inner and outer members, the engagement and disengagement of the inner and outer members are carried out by the engagement and disengagement between the wedge-shaped space and the engaging elements wherein sealing apparatus of claim 1 is arranged in an open end annular space between the inner and outer members.

4. A sealing apparatus comprising:

a slinger having a substantially L-shaped cross-section including a cylindrical portion to be fitted on a member of rotational side and an upstanding portion radially extending from one end of the cylindrical portion;

a core member having a substantially L-shaped cross-section including a cylindrical portion to be fitted in a member of stationary side and an upstanding portion radially extending from one end of the cylindrical portion; and a sealing element on the upstanding portion of the core member including one or more side lips adapted to be slidably contacted with the upstanding portion of the slinger and said sealing element has one or more radial lips adapted to be slidably contacted with the cylindrical portion of the slinger, wherein the thickness of the core member and/or the slinger at the junction between the upstanding portion and the cylindrical portion is thinner than the thickness of the cylindrical portion immediately adjacent the junction, such that the interference of the cylindrical portion is the core member and/or the slinger is smaller at the junction than the adjacent cylindrical portion when fitted in the member.

* * * * *